May 14, 1963   G. KIPER   3,089,400
CAMERA SHUTTER ASSEMBLY
Filed Dec. 16, 1958   2 Sheets-Sheet 2

INVENTOR.
Gerd Kiper
BY
Michael S. Striker
Attorney

United States Patent Office 3,089,400
Patented May 14, 1963

3,089,400
CAMERA SHUTTER ASSEMBLY
Gerd Kiper, Munich, Germany, assignor to Agfa Aktiengesellschaft, Munich, Germany
Filed Dec. 16, 1958, Ser. No. 780,771
Claims priority, application Germany Dec. 18, 1957
3 Claims. (Cl. 95—63)

The present invention relates to cameras.

More particularly, the present invention relates to camera shutter assemblies.

In a conventional camera shutter assembly the shutter blades are actuated by a pair of rings which move in order to turn the shutter blades from their closed to their open position and then back to their closed position in order to expose the film. Then it is necessary to return these rings back to their starting position without moving the shutter blades with respect to each other so that the film will not be exposed during the return of the rings to their starting position after an exposure has been made. The necessity of returning the rings to their starting position without actuating the shutter blades creates considerable difficulty because of the complicated mechanisms necessary for this purpose, and even with the conventional structures for this purpose it sometimes happens that during return of the shutter rings to the starting position the shutter blades are inadvertently moved so as to cause an undesired exposure.

One of the objects of the present invention is to provide a camera shutter assembly which does not require the rings which actuate the shutter blades to be returned to a starting position after each exposure.

Another object of the present invention is to provide a shutter assembly which is made up of a relatively small number of simply constructed elements which are very reliable in operation.

A further object of the present invention is to provide a shutter assembly whose components occupy a relatively small amount of space.

An additional object of the present invention is to provide a camera shutter assembly where the shutter blades are ready for the next exposure immediately after the preceding exposure has been completed.

With the above objects in view the present invention includes in a camera shutter assembly a shutter blade means having open and closed positions. A pair of coaxial ring means are turnable about a common axis and are operatively connected with the shutter blade means for turning the latter from its closed to its open position during turning of one of these ring means with respect to the other and for moving the shutter blade means from its open to its closed position during subsequent turning of the other of the ring means with respect to the first ring means. The pair of ring means have the same positions relative to each other when the shutter blade means is in its closed position, and the pair of ring means remains stationary during cocking of the shutter assembly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Figure 1:
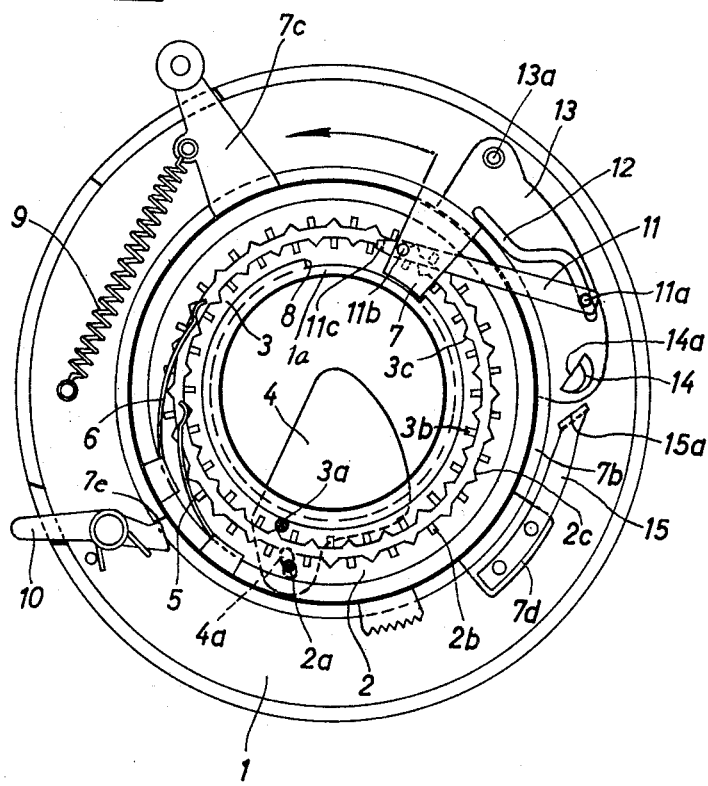
FIG. 1 shows the structure of the invention in an elevation view taken in a plane normal to the optical axis of the shutter assembly.

The shutter assembly of the invention includes a support means in the form of a housing 1, this housing including an inner tube 1a, an intermediate tube 1b surrounding the inner tube, and an outer tube 1c surrounding the intermediate tube, all of these tubes being coaxial and spaced from each other and being carried by a wall 1d which is located in a plane normal to the optical axis. A shutter ring 3 is turnably supported by the inner tube 1a of the housing 1 between this inner tube and the intermediate tube 1b of the housing 1, while a second shutter ring 2 is coaxial with the inner ring 3, surrounds the latter, and is turnably supported by the intermediate tube 1b of the support means 1 between this intermediate tube and the inner ring 3. The rings 2 and 3 form a pair of ring means which are operatively connected with the shutter blade 4 for turning the latter from the closed position thereof shown in the drawing to an open position and then back to a closed position. Only one shutter blade 4 is shown in the drawing for the sake of clarity. A plurality of such shutter blades are provided overlapping each other in a conventional manner. The shutter blade means 4 has a pivotal connection with the inner ring means 3, this pivotal connection being shown at 3a, and a pin and slot connection with the outer ring 2. Thus, the ring 2 fixedly carries a pin 2a, and this pin 2a is located in a slot 4a formed in the shutter blade 4. When the inner ring 3 turns in a counterclockwise direction, shown by the arrow in the drawing, with respect to the outer ring 2, then the blade 4 will turn with respect to the pivot pin 3a outwardly away from the optical axis to an open position which will expose the film, and when the outer ring 2 subsequently moves in the same direction as the inner ring 3 the shutter blade 4 will return to its closed position. Whenever the shutter blades 4 return to their closed position after an exposure and in order to terminate the exposure the rings 2 and 3 have the same positions relative to each other so that the assembly is immediately ready for the next exposure after one exposure has been completed. Thus, it will be seen that the pair of ring means 3 and 2 turn in a stepwise fashion in the same direction but at different times, the ring means 3 turning first and then the ring means 2 turning with respect to the ring means 3 until the pair of ring means again have their original positions relative to each other. It is only after a number of exposures have been made that the pair of ring means 2 and 3 will have turned through the same angular position that they were at the beginning. In other words the pair of ring means 2 and 3 will have turned through a complete revolution only after a plurality of exposures have been made.

The pair of ring means 2 and 3 respectively carry at their peripheral portions which are nearest to each other teeth 2b and 3b. The teeth 3b are equidistantly spaced from each other and the angular distance between the teeth 3b is the same as the angular distance through which the ring 3 turns during one cycle of operations of the shutter. In the same way the teeth 2b have the same angular distance from each other, this angular distance being equal to the angle through which the ring 2 turns during one cycle of shutter operation. Thus, the distance between the teeth 2b equals the angular distance through which the ring 2 turns when moving the shutter blades from their open to their closed positions.

The shutter assembly of the invention also includes a detent means for releasably holding the ring means 2 and 3 in their angular positions when the shutter blade means is in its closed position, and this detent means includes a plurality of notches 2c formed in the inner periphery of the outer ring 2 and a plurality of notches 3c formed in the outer periphery of the inner ring 3. The angular distance between the notches 2c is the same as the angular distance between the teeth 2b, and the angular distance between the notches 3c is the same as the angular distance between the teeth 3b. This detent means further includes a pair of leaf springs 5 and 6 fixedly carried by the support means 1 and having free ends which respectively cooperate with the notches 3c and 2c in the manner shown in the drawing. It will be seen that the leaf springs 5 and 6 are fixedly carried at one end by the intermediate tube 1b of the support means. Thus, the springs 5 and 6 cooperate with the notches to releasably retain the rings 2 and 3 in the same relative positions with respect to each other when the shutter blade means 4 is in its closed position.

A drive means is provided for driving first the ring means 3 in order to move the shutter blade means 4 from its closed to its open position and then the outer ring means 2 in the same direction as the ring means 3 for subsequently moving the shutter blade means 4 from its open back to its closed position. This drive means includes a drive member 7 the movement of which is limited by an arcuate cutout 8 in which the end of drive member 7 nearest to the common axis of the rings extends. The inner tube of the support means 1 has an outwardly directed annular flange formed with the arcuate cutout 8 into which the innermost end of the drive member 7 extends. This drive member 7 is fixedly carried by a third ring 7b which is turnably supported by the intermediate tube of the support means 1 for turning movement around this intermediate tube, and the drive member 7 projects from the ring 7b toward the common axis of all of the rings. The outer tube of the support means 1 is formed with a slot through which a shutter cocking lever 7c extends, and this lever 7c is fixed at its inner end to the third ring 7b. A spring 9 is fixed at one end to the lever 7c and at an opposite end to the transverse wall of the support means 1 for urging the lever 7c and the ring 7b and drive member 7 therewith in a counter-clockwise direction, as viewed in the drawing. The structure is shown in the cocked position in the drawing, and it will be noted that in this position the drive member 7 is at the right end of the cutout 8, as viewed in the drawing. The ring 7b is provided with a shoulder or step 7e (FIG. 1) engaged by a release lever 10 which also extends through a slot of the outer tube to the exterior of the shutter assembly so that it is accessible to the operator. This lever 10 is pivotally carried by the transverse wall of the support means 1 and has at its right end, as viewed in the drawing, a tooth which engages the shoulder of the ring 7b to prevent turning of the latter by the spring 9 when the shutter assembly is cocked. A wire spring is wound around the pivot pin which supports the lever 10, engages with one end a stationary pin carried by the transverse wall of the support means 1, and engages with its opposite end the lever 10 at the right side of the pivot pin which supports the same so as to urge the lever 10 in a counterclockwise direction, as viewed in the drawing, and this wire spring is stronger than the spring 9 so that when the parts are in the position illustrated in the drawing the lever 10 will hold the shutter assembly cocked. As soon as the operator turns the lever 10 in a clockwise direction, the shutter assembly is released and the spring 9 turns the ring 7b in a counterclockwise direction, as shown by the arrow in the drawing.

The drive means for driving the ring means 2 and 3 includes in addition to the drive member 7 an elongated pawl 11 which is pivotally connected to the drive member 7 by a pivot pin 11b. Thus, the pawl 11 will turn together with the drive member 7 around the common axis of the rings. A cam means is provided for controlling the turning of the pawl member 11 with respect to the drive member 7 around the axis of the pivot pin 11b. This cam means includes a plate 13 carried by the intermediate tube of the housing 1 between this intermediate tube and the outer tube of the housing 1, and this plate is formed with a camming slot 12 having the configuration shown in the drawing. The cam means further includes a pin 11a carried by the pawl 11 and located in the slot 12 so that during the turning of the drive member 7 along the cutout 8 the pin 11a will cooperate with slot 12 to turn the pawl 11 in a controlled manner with respect to the drive member 7. The left end 11c of the pawl member 11, as viewed in the drawing, extends beyond the drive member 7 and cooperates with the teeth 3b and 2b of the pair of ring means 3 and 2, respectively.

When the shutter assembly of the invention is cocked as shown in the drawing the drive member 7 is at the right end of the cutout 8 and the pin 11a is at the right end of the camming slot 12, as viewed in the drawing. When the shutter release lever 10 is turned the spring 9 turns the ring 7b in the direction of the arrow shown in the drawing. At this time the end 11c of the pawl 11 engages a tooth 3b of the ring 3 to turn the latter in the direction of the arrow. At the moment of turning of the ring 3 the notch which receives the free end of the leaf spring 5 moves away from the free end of this leaf spring, and when the next notch 3c reaches the free end of the leaf spring 5 the latter free end will be received in this next notch to stop the turning of the ring 3 and thus control precisely the extent to which the ring 3 turns during a single cycle of shutter operation.

Before the leaf spring 5 is received in the next notch, however, the pawl 11 has been actuated by the slot 12 so that its end 11c no longer engages the tooth of the ring 3, and the latter continues to turn as a result of its kinetic energy until the next notch engages the spring 5 to stop the turning of the ring 3. This turning of the ring 3 causes the shutter blade means 4 to move from its closed to its open position.

After this operation, the pawl 11 is moved by the camming slot 12 into a space between a pair of the teeth of the ring 2 and then comes into engagement with one of the teeth 2b. In this way the turning of the ring 2 in the direction of the arrow shown in the drawing starts at this time and thus the shutter blade means 4 is moved from its open back to its closed position during this phase of the operation. The extent of closing movement of the ring 2 corresponds to the space between the teeth thereof and is limited by cooperation between the driving member 7 and the cutout 8. It is also possible to stop the movement of the drive member 7 before it reaches the left end of the cutout 8, as viewed in the drawing, and the ring 2 will continue to turn as a result of its kinetic energy until the next notch 2c reaches the free end of the leaf spring 6 to receive the free end of the latter and thus stop the movement of the ring 2 when it again has its original angular position with respect to the ring 3 where the shutter blade means 4 is in its closed position.

Figure 2:
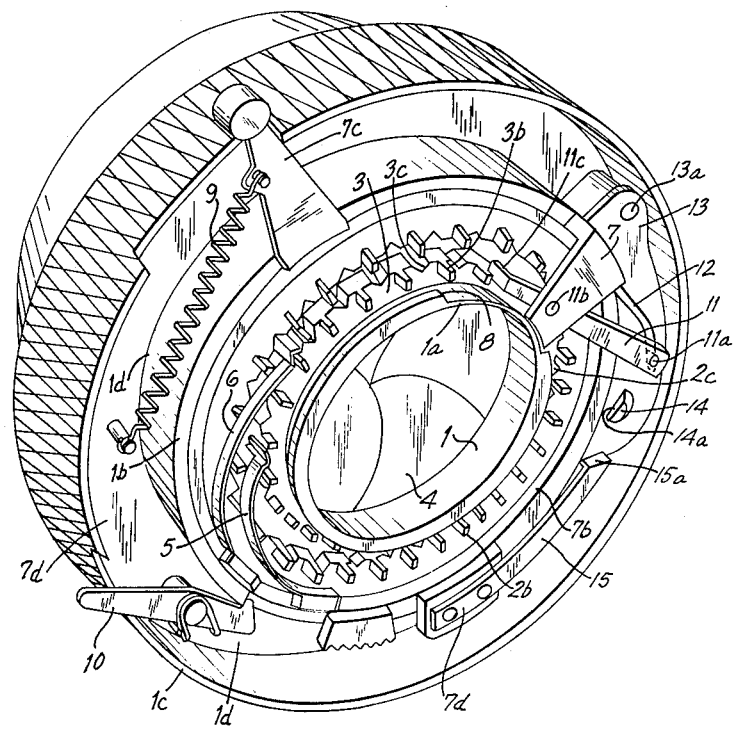
FIG. 2 is a perspective view of the structure of FIG. 1.

During cocking of the shutter the lever 7c is turned in a clockwise direction and the drive member 7 also turns in a clockwise direction at this time. In order to enable the pawl 11 to move by the teeth of the rings 2 and 3 without turning these rings which remain stationary during the cocking of the shutter, the plate 13 which is provided with the camming slot 12 is supported as shown in FIG. 2 for turning movement with respect to the support means 1 for example by the means 14, 14a, 15, 15a in such a way that this plate 13 turns during cocking of the shutter to enable the pawl 11 to clear the teeth 3b so that the rings 2 and 3 will remain stationary during cocking of the shutter. The plate 13 is turnable about the stationary pivot pin 13a and carries the projection 14 which is fixed in any suitable way to the plate 13 as by being integral therewith, this projection 14 having an inclined face 14a shown in FIGS. 1 and 2. At its lowest part, as viewed in FIGS. 1 and 2, the projection 14 merges smoothly into the surface of plate 13 which is visible in the drawings. The leaf spring 15 which is fixedly carried by the radial projection 7d of the ring 7b, so that the parts 7d and 15 turn with the ring 7b, has an end 15a which rides on the surface of plate 13 from which projection 14 extends. When the shutter is released so that the ring 7b is turned by spring 9 in a counterclockwise direction, as viewed in the drawings, the end 15a of the leaf spring 15 rides over the projection 14 without turning the plate 13 and the parts function as described above. When the shutter is cocked, however, the end 15a of the leaf spring 15 engages the inclined surface 14a to turn the plate 13 in a counterclockwise direction about the pin 13a, as viewed in the drawings, and this turning of the plate 13 together with the turning of the ring 7b and drive member 7 in a clockwise direction cooperate to turn the end 11c of member 11 past the teeth of the rings 3 and 2 without engaging these teeth so that the parts will again assume the cocked position shown in the drawings without turning the pair of ring means 2 and 3 during cocking of the shutter. As soon as the end 15a of leaf spring 15 moves beyond projection 14 the plate 13 returns by gravity to the position shown in the drawings.

It will be noted from the above description that a particular advantage of the invention resides in the fact that the rings 2 and 3 as well as the shutter blade means 4 are in a position ready for the next cycle of operation immediately after an exposure has been made. In this way there is no danger that the shutter blades will move undesirably to a partially open position during return of the rings 2 and 3 to their starting position, as in a conventional shutter assembly, such partial opening of the shutter resulting from non-uniform turning of the rings when they are returned to their starting position. Furthermore, the capability of the camera which includes the shutter assembly of the invention to rapidly take pictures in succession is increased with the structure of the invention since it is not necessary to move the entire shutter assembly when cocking the shutter. With the assembly of the invention it is only necessary to return the shutter driving structure to its starting position, the rest of the shutter assembly remaining stationary at this time, so that it is a simple matter to very quickly cock the shutter and make the next exposure.

While the invention has been illustrated and described as embodied in camera shutter assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristic of the generic or specific aspects of this invention and, therefore, such adaptations should and are intended to be comprehended within the meaning and range of equivalence of the following claims.

What is claimed as new and desired to be secured by Letters Patent is:

1. In a camera shutter assembly, in combination, support means; first and second coaxial shutter rings turnably carried by said support means for turning movement around their common axis; a shutter blade having a pivot connection with one of said rings and a pin and slot connection with the other of said rings and being movable from a closed to an open position during turning of said first ring in one direction about said axis with respect to said second ring and from said open to said closed position during turning of said second ring about said axis in said one direction with respect to said first ring, said first and second rings having the same positions relative to each other when said blade is in said closed position thereof; a plurality of teeth carried by each ring; a third ring coaxial with said first and second rings and carried by said support means for turning movement around said axis; a drive member carried by said third ring; a pawl turnably carried by said drive member and engaging the teeth of said rings for turning the latter in said one direction when said drive member and third ring turn in said one direction; and cam means carried by said support means and cooperating with said pawl for turning the latter with respect to said drive member while the latter and said third ring turn in said one direction from a first position where said pawl engages the teeth of said first ring to turn the latter while said pawl is in said first position with respect to said drive member to a second position where said pawl engages the teeth of said second ring during continued turning of said third ring and drive member therewith so that said first ring turns first in said one direction to move said blade from said closed to said open position and said second ring then turns in said one direction to move said blade from said open to said closed position thereof.

2. In a camera shutter assembly, in combination, support means; first and second coaxial shutter rings turnably carried by said support means for turning movement around their common axis; a shutter blade having a pivot connection with one of said rings and a pin and slot connection with the other of said rings and being movable from a closed to an open position during turning of said first ring in one direction about said axis with respect to said second ring and from said open to said closed position during turning of said second ring about said axis in said one direction with respect to said first ring, said first and second rings having the same positions relative to each other when said blade is in said closed position thereof; a plurality of teeth carried by each ring; a third ring coaxial with said first and second rings and carried by said support means for turning movement around said axis; a drive member carried by said third ring; a pawl turnably carried by said drive member and engaging the teeth of said rings for turning the latter in said one direction when said drive member and third ring turn in said one direction; cam means carried by said support means and cooperating with said pawl for turning the latter with respect to said drive member while the latter and said third ring turn in said one direction from a first position where said pawl engages the teeth of said first ring to turn the latter while said pawl is in said first position with respect to said drive member to a second position where said pawl engages the teeth of said second ring during continued turning of said third ring and drive member therewith so that said first ring turns first in said one direction to move said blade from said closed to said open position and said second ring then turns in said one direction to move said blade from said open to said closed position thereof; and releasable detent means carried by said support means and cooperating with said first and second rings for releasably holding the latter in the same angular positions with respect to each other when said shutter blade is in its closed position.

3. In a camera shutter assembly, in combination, an inner tube; an intermediate tube coaxially surrounding said inner tube; an outer tube coaxially surrounding said inner tube; a wall located in a plane normal to the common axis of said tubes and carrying the latter; an inner ring turnably supported by said inner tube between the latter and said intermediate tube; an outer ring turnably supported by said intermediate tube between the latter and said inner ring; a shutter blade pivotally connected to one of said rings and having a pin-and-slot connection with the other of said rings; a third ring turnably supported by said intermediate tube between the latter and said outer tube; a plurality of teeth carried by said inner and outer rings; a drive member carried by said third ring and extending therefrom toward the axis of said tubes; a pawl pivotally connected to said drive member for engaging the teeth of said inner and outer rings; and cam means carried by said intermediate tube between the latter and said outer tube and cooperating with said pawl for turning the latter from engagement with the teeth of said inner ring to engagement with the teeth of said outer ring during turning of said third ring.

References Cited in the file of this patent

UNITED STATES PATENTS

| | | |
|---|---|---|
| 2,593,873 | Gorey | Apr. 22, 1952 |
| 2,890,640 | Noack | June 16, 1959 |
| 2,943,551 | Gebele | July 5, 1960 |